(12) United States Patent
Kelling et al.

(10) Patent No.: US 6,772,142 B1
(45) Date of Patent: Aug. 3, 2004

(54) METHOD AND APPARATUS FOR COLLECTING AND EXPRESSING GEOGRAPHICALLY-REFERENCED DATA

(75) Inventors: Steven T. Kelling, Berkshire, NY (US); Ronald M. Beloin, Ithaca, NY (US); John W. Fitzpatrick, Ithaca, NY (US); Frank B. Gill, Rushland, PA (US); Roger L. Slothower, Ithaca, NY (US); Thomas A. Fredericks, Van Etten, NY (US)

(73) Assignees: Cornell Research Foundation, Inc., Ithaca, NY (US); National Audubon Society, Inc., New York, NY (US)

( * ) Notice: Subject to any disclaimer, the term of this patent is extended or adjusted under 35 U.S.C. 154(b) by 176 days.

(21) Appl. No.: 09/702,407

(22) Filed: Oct. 31, 2000

(51) Int. Cl.[7] .............................................. G06F 17/30
(52) U.S. Cl. ............................ 707/3; 707/10; 707/103; 709/217; 701/206
(58) Field of Search ...................... 707/3–5, 100–104.1; 709/217, 218, 200, 206, 208, 220, 229; 701/200, 206, 208

(56) References Cited

U.S. PATENT DOCUMENTS

| | | |
|---|---|---|
| 5,329,108 A | 7/1994 | Lamoure .................... 235/494 |
| 5,379,419 A | 1/1995 | Heffernan et al. ............ 707/4 |
| 5,543,788 A | 8/1996 | Mikuni ....................... 349/990 |
| 5,652,717 A | 7/1997 | Miller et al. .................... 703/6 |
| 5,752,023 A | 5/1998 | Choucri et al. ............... 707/10 |
| 5,781,773 A | 7/1998 | Vanderpool et al. ........ 707/100 |
| 5,848,378 A | 12/1998 | Shelton et al. ................. 702/3 |
| 5,864,337 A | 1/1999 | Marvin ....................... 345/708 |
| 5,893,093 A | 4/1999 | Wills ............................. 707/5 |
| 5,930,474 A | 7/1999 | Dunworth et al. .......... 709/217 |
| 6,018,699 A | 1/2000 | Baron, Sr. et al. .............. 702/3 |
| 6,023,223 A | 2/2000 | Baxter, Jr. ................... 340/531 |
| 6,038,566 A | 3/2000 | Tsai ........................... 707/102 |
| 6,061,688 A | 5/2000 | Kilpatrick et al. .......... 707/102 |
| 6,112,200 A * | 8/2000 | Livshutz et al. ............... 707/4 |
| 6,202,065 B1 * | 3/2001 | Wills ............................. 707/5 |
| 6,295,528 B1 * | 9/2001 | Marcus et al. ................. 707/3 |

OTHER PUBLICATIONS

Jul. 17, 2000, Depatment of Systems Ecology, Marine Ecosystem Modeling Group, Stockholm University, WWW Page, http://data.ecology.su.se/models/BEDonWeb/nest/.

(List continued on next page.)

*Primary Examiner*—Shahid Alam
*Assistant Examiner*—Jean Bolte Fleurantin
(74) *Attorney, Agent, or Firm*—Perkins Smith & Cohen LLP; Jacob N. Erlich; John A. Hamilton

(57) ABSTRACT

A web-based implemented system in which observers may pinpoint locations on a scalable map in order to fix data by latitude and longitude and to collect data describing that location. Also permitted within the system is the selection of non-contiguous groups of geographic data points for analysis. Although not limited thereto, the system may be used to track bird sightings and migration patterns as well as other bird related information and data. The mapping is scalable and can be integrated with a Geographic Information System (GIS), e.g. elevation, vegetation or city maps. Variations over time can be analyzed for a specific point, and pattern movements across points can be tracked.

24 Claims, 8 Drawing Sheets

OTHER PUBLICATIONS

Sokolov, Alexander, and Wulff, Fredrik, "Time Series—a web application for oceanographic data analysis," Jan. 14, 1998, Department of Systems Ecology, Marine Ecosystem Modeling Group, Stockholm University, WWW Page, http://data.ecology.su.se/models/BEDonWeb/Articles/TimeSeries.

Sokolov, Alexander, and Wulff, Fredrik, "SwingStations—a WWW tool for working with the Baltic Environmental Database," Feb. 24, 1999, Department of Systems Ecology, Marine Ecosystem Modeling Group, Stockholm University, WWW Page, http://data.ecology. su.se/models/BEDonWeb/SwingStations/.

Sokolov, Alexander, "NetStations—a web based tool for data analysis I a distributed collections of heterogeneous databases," Jun. 16, 1999, Department of Systems Ecology, Marine Ecosystem Modeling Group, Stockholm University, WWW Page, http://data.ecology. su.se/models/BEDonWeb/NetStations/.

*Sokolov, Alexander, "Nest—an information environment for decision support system,".

* cited by examiner

| | |
|---|---|
| 350 | PROJ_ID |
| 352 | OBS_DT |
| 354 | SPECIES_CODE |
| 356 | HOW_MANY |
| 358 | VALID |
| 360 | PROTOCOL_ID |
| 362 | LOC_ID |
| 364 | USER_ID |
| 366 | DURATION_HRS |
| 368 | COMMENTS |
| 370 | CREATION_DT |
| 372 | LAST_EDITED_DT |
| 374 | REVIEWED |

FIG. 5

| | |
|---|---|
| 300 | LOC_ID |
| 302 | NAME |
| 304 | DESCRIPTION |
| 306 | ENTRY_TECHNIQUE |
| 308 | UNCERTAINTY_RADIUS |
| 310 | CREATION_DT |
| 312 | LAST_EDITED_DT |
| 314 | OWNER_ID |
| 316 | LATITUDE |
| 318 | LONGITUDE |
| 320 | STATPROV_LIST |
| 322 | COUNTRY_CODE |
| 324 | FEATURE |
| 326 | IN_USE |

FIG. 4

METHOD AND APPARATUS FOR COLLECTING AND EXPRESSING GEOGRAPHICALLY-REFERENCED DATA

FIELD OF THE INVENTION

This invention relates generally to data collection and retrieval, and more particularly to collection and retrieval of geographically-referenced data and to data collection from a plurality of observers over the Internet.

BACKGROUND OF THE INVENTION

When studying phenomena having specific occurrences over a widespread geographic area, it is desirable to be able to receive data from a plurality of observers. Where the specific occurrences are mobile, such as birds, or likely to move rapidly, such as a highly infectious disease, collection of data in real-time from the plurality of observers is essential to a full and accurate study. In order to participate easily, the observers need an easy way to report their findings and to link the data to the geographic location to which it relates. Linking the data in some way in addition to the geographic reference is desirable. Non-contiguous points should be linkable in order to effectively analyze the data.

It remains desirable to facilitate multiple observer projects conducted over a large geographic area.

It is an object of the present invention to provide a method and apparatus to enable a plurality of observers to input geographically-referenced data in real time.

It is another object of the present invention to provide a method and apparatus to enable analysis of non-contiguous geographically-referenced data.

It is another object of the present invention to provide a method and apparatus to enable ornithological studies.

SUMMARY OF THE INVENTION

The problems of collecting and expressing geographically-referenced data are solved by the present invention of a web-based method and apparatus for collecting and expressing geographically-referenced data.

Internet observers may pinpoint locations on a scalable map in order to fix data by latitude and longitude. It also permits the selection of non-contiguous groups of geographic data points for analysis. The system may be used to track bird sightings and migration patterns. The mapping is scalable and can be integrated with a Geographic Information System (GIS), e.g. elevation, vegetation or city maps. Variations over time can be analyzed for a specific point, and pattern movements between points can be tracked.

The present invention together with the above and other advantages may best be understood from the following detailed description of the embodiments of the invention illustrated in the drawings, wherein:

BRIEF DESCRIPTION OF THE DRAWINGS

FIG. 4 is a table of fields of the locations table of the spatially-linked database of FIG. 1;

FIG. 5 is a table of fields of the observations table of the spatially-linked database of FIG. 1;

DETAILED DESCRIPTION OF PREFERRED EMBODIMENTS

Figure 1:
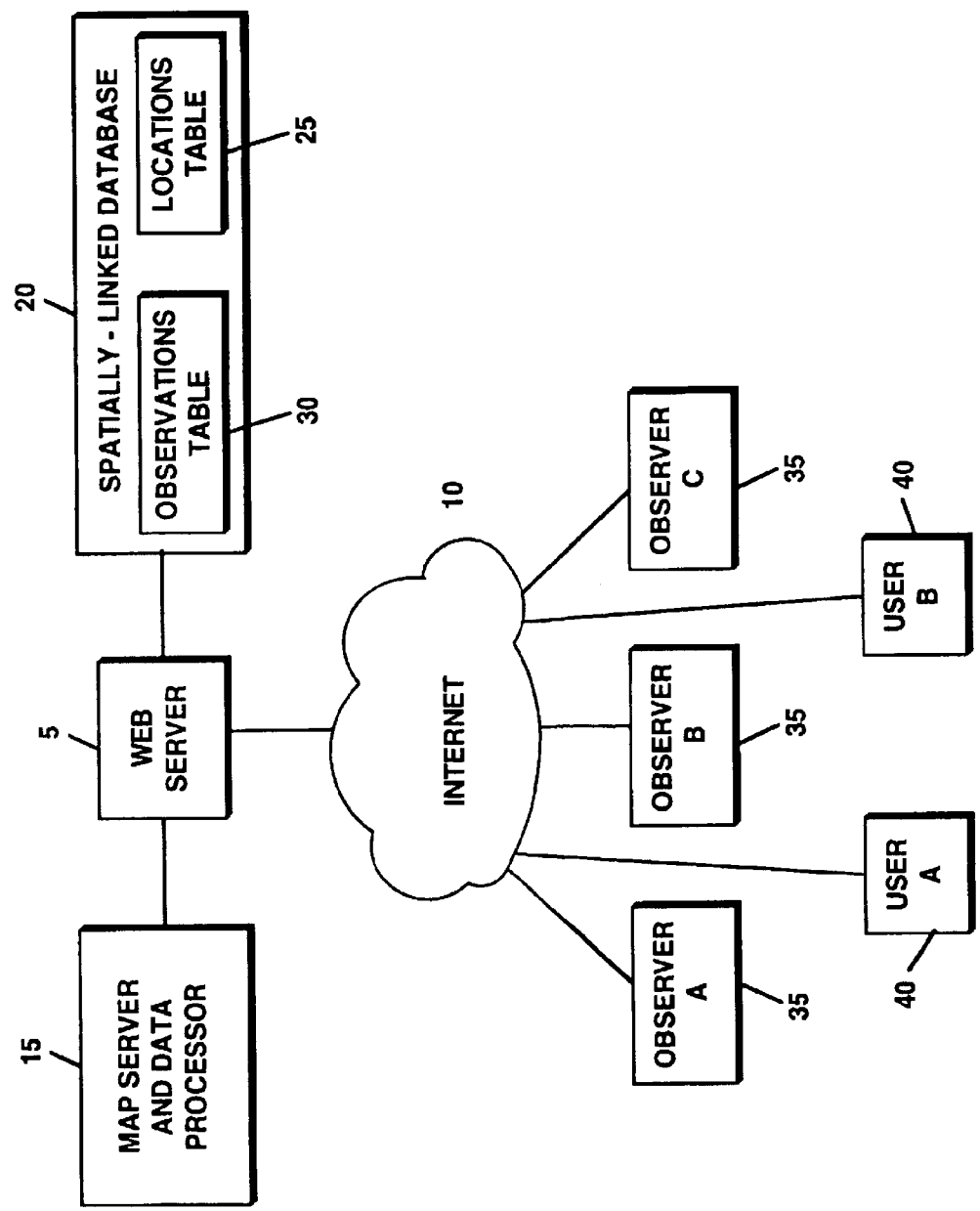
FIG. 1 is a block diagram of a system for collecting and expression of geographic-referenced data according to principles of the invention.

FIG. 1 shows a web-based system for collecting and expressing geographic-referenced data according to principles of the invention. A web server 5 is connected to the Internet 10. A map server/data processor ("map server") 15 and a spatially-linked database 20 are connected to the web server 5. The configuration is merely exemplary. For example, in alternative embodiments, the map server and database may be combined, the map server and the database may be connected together by a non-Internet network, or the data processor portion may be separated from the map server. Other configurations are possible within the scope of the invention.

The database 20 stores data records having the general form of a location and data associated with that location. In the present embodiment of the invention, the data is stored as two tables, a locations table 25 and an observations table 30. The tables will be described in detail below. In an illustrative embodiment of this invention, the database comprises a plurality of locations for storing data from corresponding of a set of points disposed within a geographic area. The geographic area may illustratively be small, e.g., Central Park within New York City, or as large as the entire earth, depending upon the needs of the user to collect data. Until established as a data collection site as explained below, the locations of the points are initially undetermined. Each of the storage locations is dedicated to storing data related to a corresponding point within the geographic area. More particularly, the data may illustratively reflect an event occurring at its point. In an illustrative embodiment of this invention, the event may be a bird siting. As will be elaborated below, there are many other events that may be observed and applications for this invention. In one illustrative embodiment of this invention, data base is characterized as being geographically structured, e.g., each storage location is addressed according to the geographic coordinates of the point to which the data stored therein is related. Other database configurations are possible within the scope of the present invention. For example, it is possible to store the locations and observations in the same table.

A plurality of observers 35 are connected to the map server and database over the Internet. A plurality of non-observing users 40 are also able to access the system over the Internet. Often, an observer and a non-observing user will be the same entity. The observers and non-observing users are clients of the map server. The map server serves an interactive map which the observers use to enter data into the system and the users use to query the system.

The current embodiment of the present invention includes software applications from the Environmental Systems Research Institute, Inc. located in Redlands, Calif. The MapObjects Internet Map Server connects an application program written in Visual Basic to a web server. It enables two-way, stateless communication between the application program and the web browser. Stateless here means that there is no session management and that each communication is a unique event. MapObjects is an Active X control object (also a COM object). MapObjects is a plug-in module for Visual Basic and other languages that renders maps from data files of map features.

An example of a use for the present system is ornithology studies, specifically the study of bird migration. The study of bird migration takes place over a large geographic area with data collected from a plurality of observers. The mobility of the subject birds in a study requires real-time entry of observed data. Potentially, observers over the entire range of the study area may enter data using the system of the present invention.

Creating an Observation Site

Figure 2:
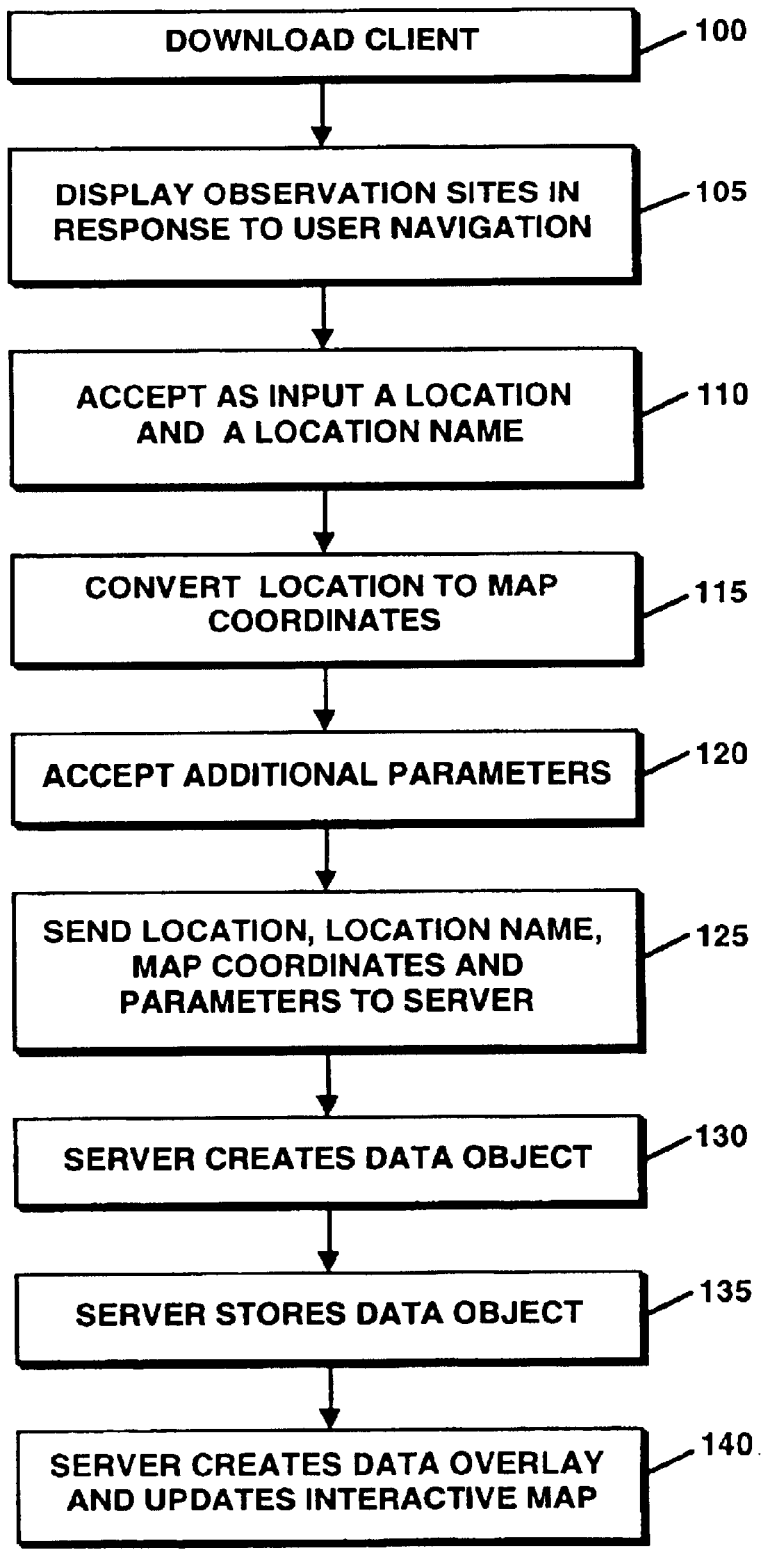
FIG. 2 is flow chart of the process of creation of an observation site according to principles of the invention.

FIG. 2 is a flow chart of the process of creating an observation site on the interactive map, the site to be stored in the database.

First, the client program is downloaded over the Internet, block 100. In the present embodiment of the invention, the user's browser loads a Java applet. In alternative embodiments of the invention, the client program may use other languages. The user is presented with a map of the project area, along with tools to navigate the map (pan, zoom, etc.).

Next, as the user navigates to smaller map extent, already-existing observation sites become visible, block 105. At even smaller map extent, point creation tools become available. The map scale at which the point creation tools becomes visible is a configurable property. In the present embodiment of the invention, the point-making tools become visible when a tenth of a degree of latitude or less is visible on the map.

Then, the user, or data gatherer, indicates that an observation site is to be created, in the present embodiment, by clicking with a mouse on a point on the map. The map accepts a map point entered by the user, block 110. The client program draws a point for feedback, and the user can make further clicks on the map to adjust the point. Other types of data entry are possible within the scope of the present invention.

The user is then prompted to provide a name for the point, block 110.

After the user completes the location, the user submits the location to the system. The client program packages the location as a set of map coordinates, makes calls to the server to do map coordinate conversions, if necessary, to convert the geographic point of the location to latitude and longitude, block 115. The client program packages other parameters associated with the location, such as the user's login name, the project name, and other data associated with an event occurring at the geographic point, e.g. a bird sighting, into a URL, block 120. The URL is sent to the server, block 125.

The server parses the incoming parameters, and converts the latitude and longitude coordinate pair into an object in software that represents the location, block 130. In an illustrative embodiment of this invention, the set of maps displayed to the user or data gatherer includes at least one map, which is geographically referenced map. The geographically referenced map is adapted, as will be explained below, to receive a map point or mark that is placed thereon in relative position with respect to at least one reference point whose coordinates are known. As indicated above, the geographic coordinates of the point and therefore the geographic location of the map point are initially undetermined. As is well known in the art, the relative position of the map point is compared with that of the map's reference point, whereby the coordinates of the map point may be calculated, i.e., ratios of the relative distances along the axes of latitude and longitude of the map point and the reference point are calculated; the product of these ratios and the known coordinates of the reference point are an accurate indication of the coordinates of the map point or mark made by the data gatherer.

The server then adds the object, including its location attributes, to the database via the map component, which submits the location to the spatially-indexed database, block 135.

The server creates a map overlay showing the newly-entered location and sends an updated map view back to the client, block 140.

The user can repeat the previous steps to create another location, or may submit observation data associated with the newly-entered location.

The present embodiment of the invention is implemented as follows. If a user is logged in as a legitimate user for a project, the user can download the client program. The user navigates through different maps, customized for the project, until the user is close to a desired destination. If the user is zoomed in close enough, the user can click a Place Point button. This button enables the client program to capture a mouse click on the map. When the user clicks, the client program draws a dot on the map, and also shows the latitude and longitude, for feedback. The client program may have to request the server to convert the point to latitude and longitude, as some maps are in different units. The client program accepts a name in a field for the location (with some restrictions), and the user can click a button to submit the location, or, click on the map again to move it. If submitted, a URL is packaged with parameters as before. The server gets this URL and creates an object in software that represents a location, using the parameters submitted. It then adds this object to a map layer using the MapObjects software application. The server also sets other database fields associated with the location, such as, project, user, or date. Meanwhile, the client program requests a new map from the server so that the user can see the location displayed. In the present embodiment of the invention, this location is a permanent record in the spatially-indexed database of observation locations.

Submitting a Spatial Query

Figure 3:
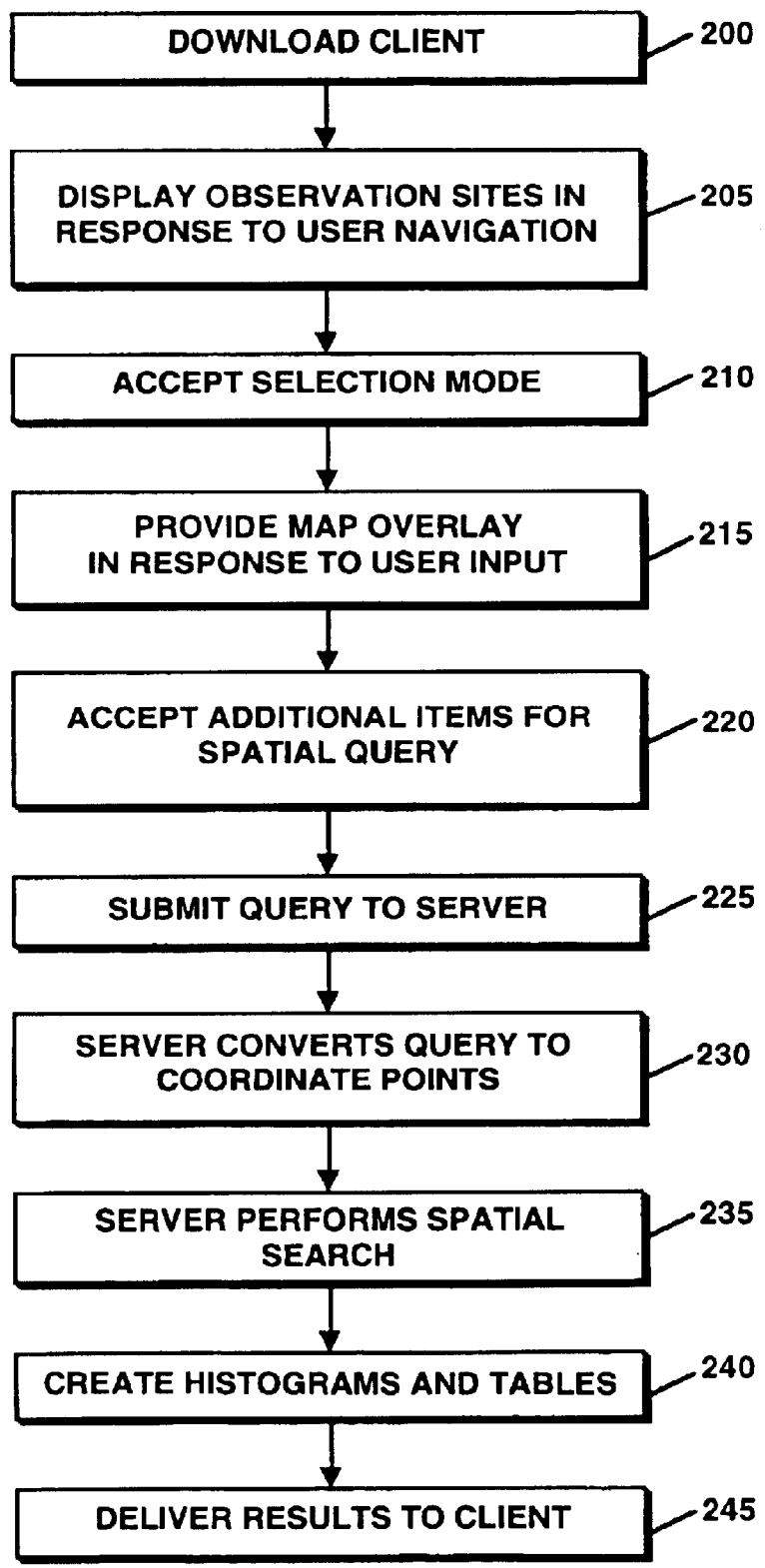
FIG. 3 is a flow chart of the process of submitting a query according to principles of the present invention.

FIG. 3 is a flow chart of the process of submitting a spatial query and receiving an output of data from the database.

First, the client program is downloaded over the Internet, block 200. In the present embodiment of the invention, the user's browser loads a Java applet. The user is presented with the map of the project area, along with tools to navigate the map (pan, zoom, etc.).

As the user navigates to smaller map scales, observation sites become visible, block 205. In the present implementation, sites designated as Christmas Bird Count (CBC) circles become visible. The Christmas Bird Count is an ongoing wildlife survey sponsored by the National Audubon Society. The survey is designed as a series of circular count areas, and observers count birds within these "circles" each year on a prespecified day around 25 December. The CBC was started in 1900 and has over 1,500 circles.

The system then accepts a choice from the user of how to select observation sites, block 210. In the present embodiment of the invention, there are four options: a single site, two or more sites one at a time, or selection by enclosing sites in an arbitrary shape or by selecting a predefined geographic area such as a state or a province.

The user then makes a selection, and the selection is indicated as a map overlay, block 215. The map overlay provides feedback as to which observation sites are being selected, and therefore will be included in the database query.

The client program also presents other choices for composing the database query, block 220. In the present embodiment of the invention these choices are which bird species to include, and what time period to cover.

The finished query is then submitted to the server, block 225. This is accomplished by the client which assembles the query parameters into a URL, and opens a connection to the server, transmitting the parameters. If the user selected the arbitrary shape for the query, the user's polygon is sent to the server as a series of map coordinate pairs.

The server parses the incoming parameters, and converts the coordinate pairs into an object in software that represents a polygon, block 230.

The server performs a spatial search, retrieving the observation sites contained within the polygon, and takes the list of observation sites found and performs a database query using the list and other parameters, block 235.

The results of the server query to the database are used to create histograms and tables of results, block 240. The histograms and tables are incorporated into an HTML page and sent to the user, block 245. The server then disposes of the results, the polygon, and parameters, and is ready for another query. The user may perform another query using the same polygon, which the client program has saved.

The present embodiment of the invention is implemented as follows. The user accesses the web site, and the client program is downloaded to the user's computer. In the client program, the user can navigate to new maps using navigation tools such as pan and zoom. The position of Christmas Bird Count circles are plotted on the maps. The user goes to a tab in the client program interface, and indicates the method to select circles (single, one by one, or by shape). If the user chooses "by shape" the user can then click on the map repeatedly. Each click becomes a vertex of a polygon. The user does not need to "close" the polygon; the client program will do it. The polygon is drawn over the map while the user creates it. When finished, the user goes to another tab in the interface and indicates which species is of interest for the query. There is a database lookup functionality to help users find a species using only part of a name. After choosing the species, the user chooses a beginning and ending year. The client program limits the number of years.

At this point, the user submits the query by clicking a button. The query parameters are packaged by the client program as standard Universal Resource Locator (URL) Web protocol parameters (i.e., http://website/.esrimap?paramter1="something"&parameter2="something+else"), and sent to the server.

When the server sees the URL, it passes the URL to the MapObjects application which in turn passes it to a Visual Basic server component. The server parses the request parameters. It takes the points that were part of the polygon and creates a software object that represents a polygon. It then performs a spatial query on the polygon asking the server which CBC circles are contained in the polygon. In the present implementation of the invention, the server uses ArcSDE from the ESRI Corporation to accomplish this. The server then uses this list, along with the species, and the years specified, to create an Structured Query Language (SQL) statement. The server uses that statement to do a standard relational database query. The results of the query are used to generate histograms and a table of results. An HTML page is created by the server and sent back to the client program in the user's browser. The client program tells the user's browser to display this new HTML page, and the user sees the histograms. The server disposes of the polygon and the query results. The client program, however, retains the points that the user specified, and the user can do a new query based on the same polygon, just changing the species or years. The points will persist until the user asks for a new map (by panning, say), or creates a new query shape or selection, or if the user quits out of the program.

FIG. 4 shows a selection of fields from the table of locations from the spatially-linked database of FIG. 1. The table has a plurality of fields. In the present embodiment, the fields are as follows:

LOC_ID 300 [Location ID]—a unique identifier for a location, assigned internally, never displayed;

NAME 302—location name;

DESCRIPTION 304—free text location description;

ENTRY_TECHNIQUE 306—method used to enter and create the location record;

UNCERTAINTY_RADIUS 308

CREATION_DT 310 [Creation Date/Time]—date/Time the observation record was created;

LAST_EDITED_DT 312 [Last Edited Date/Time]—date/Time the observation record was last edited;

OWNER_ID 314—user ID of the observer or non-observing user who 'owns' the location record;

LATITUDE 316—latitude of the location in decimal degrees;

LONGITUDE 318—longitude of the location in decimal degrees;

STATPROV_LIST 320—list of States/Provinces this location intersects;

COUNTRY_CODE 322—ISO standard country code for the location;

FEATURE 324—Link to another table which contains the map-drawing characteristics of the location; and IN_USE 326—(Yes/No) Can this location be used for new observations.

FIG. 5 shows the table of bird observations from the spatially-linked database of FIG. 1. The table has a plurality of fields. In the present embodiment, the fields are as follows:

PROJ_ID 350 [Project Identifier]—project under which the observation was made;

OBS_DT 352 [Observation Date/Time]—date and time of the observation;

SPECIES_CODE 354—a code for the bird species observed;

HOW_MANY 356—number of birds of this species observed;

VALID 358—Valid/Invalid flag: allows reviewers or bad-data filtering programs to suppress a record from reports or analyses without deleting it;

PROTOCOL_ID 360—A code for the project's data collection protocol;

LOC_ID 362 [Location ID]—a link to the Location Table Location where this observation was made;

USER_ID 364—ID of the person who made the observation;

DURATION_HRS 366—Number of hours the observer spent looking for birds; used to standardize 'HOW_MANY' based on amount of observer effort expended;

COMMENTS 368—Observer's free text comments on the observation;

CREATION_DT 370 [Creation DateTime]—Date/Time the observation record was created;

LAST_EDITED_DT 372 [Last Edited DateTime]—Date/Time the observation record was last edited; and REVIEWED 374 [Expert Reviewed]—Yes/No Indicating whether this record been expert reviewed.

The configurations of the tables in FIGS. 4 and 5 are merely exemplary. In alternative embodiments of the invention, there may be additional tables. The system has predefined required fields for data entry, however, any number of additional data fields associated with each observation or location can be defined and stored for each project.

Figure 6:
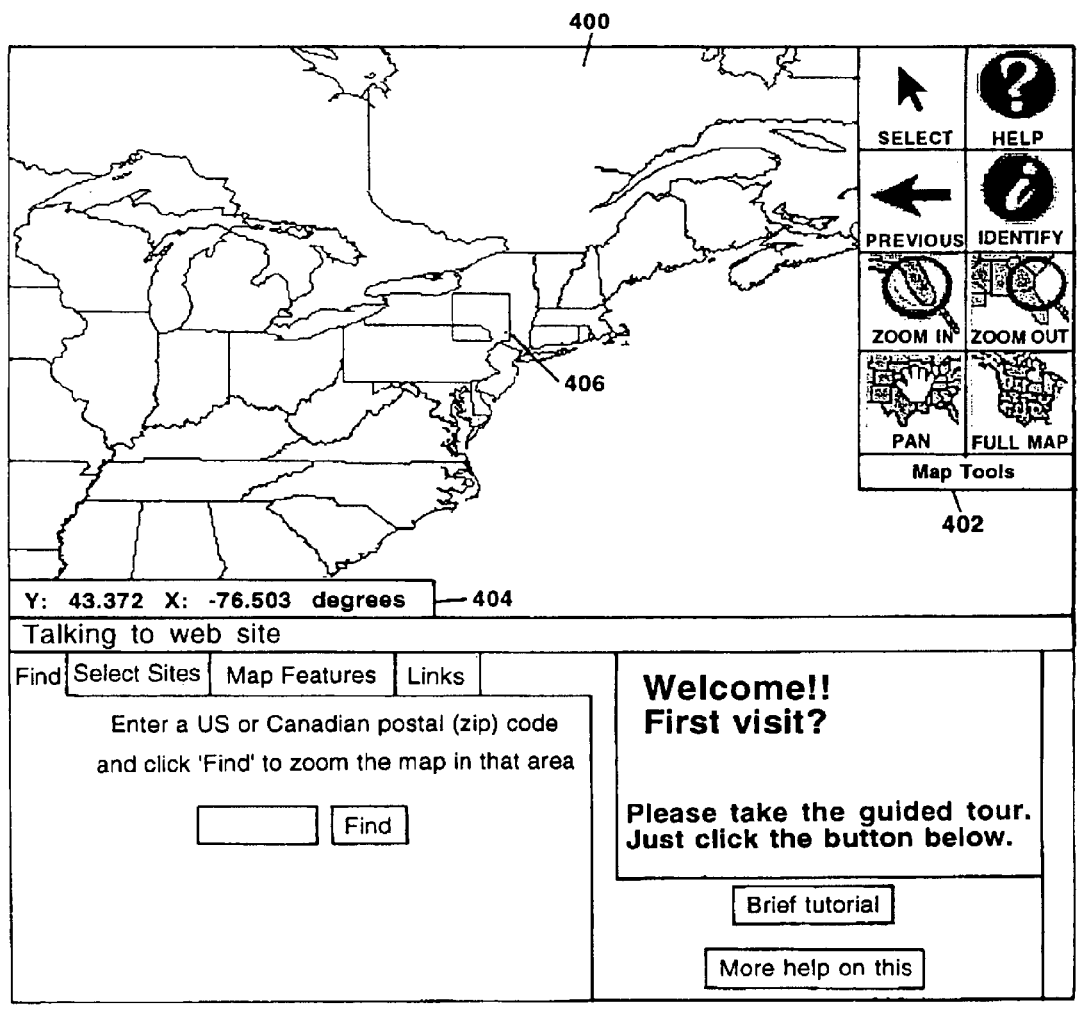
FIG. 6 is a first view of the interactive map of the present invention.

FIG. 6 is a first view of the interactive map 400 according to principles of the invention. The user is provided with a plurality of functions 402 to move around the map, e.g. to pan and to zoom in or out. The map coordinate points 404 are provided. The user may specify an area to examine more closely by drawing a polygon 406 around the desired destination.

Figure 7:
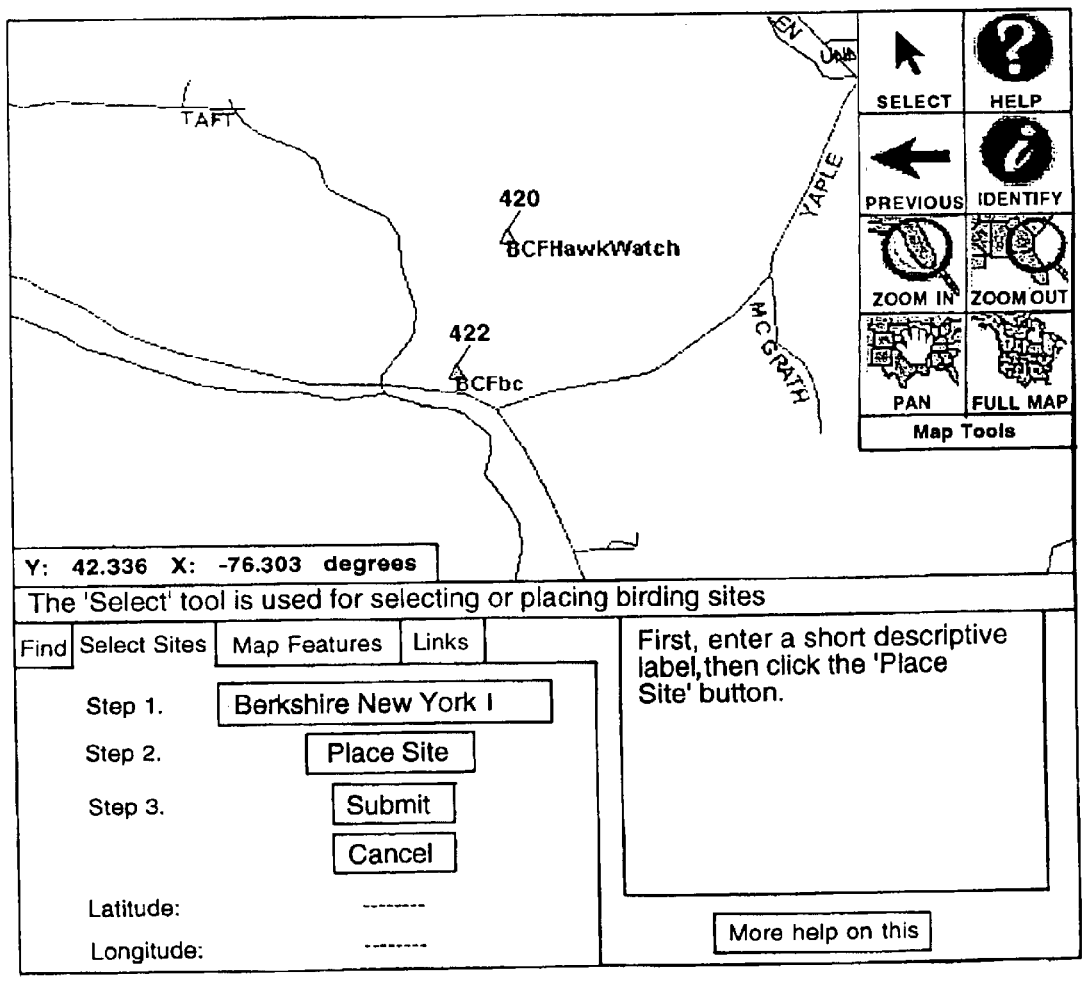
FIG. 7 is a second view of the interactive map of the present invention showing a small extent of the view of FIG. 6.

FIG. 7 is a second view of the interactive map according to principles of the invention. FIG. 7 is a zoomed in view of the area marked in FIG. 6. In the present embodiment at this scale, observation points 420, 422 become visible.

Figure 8:
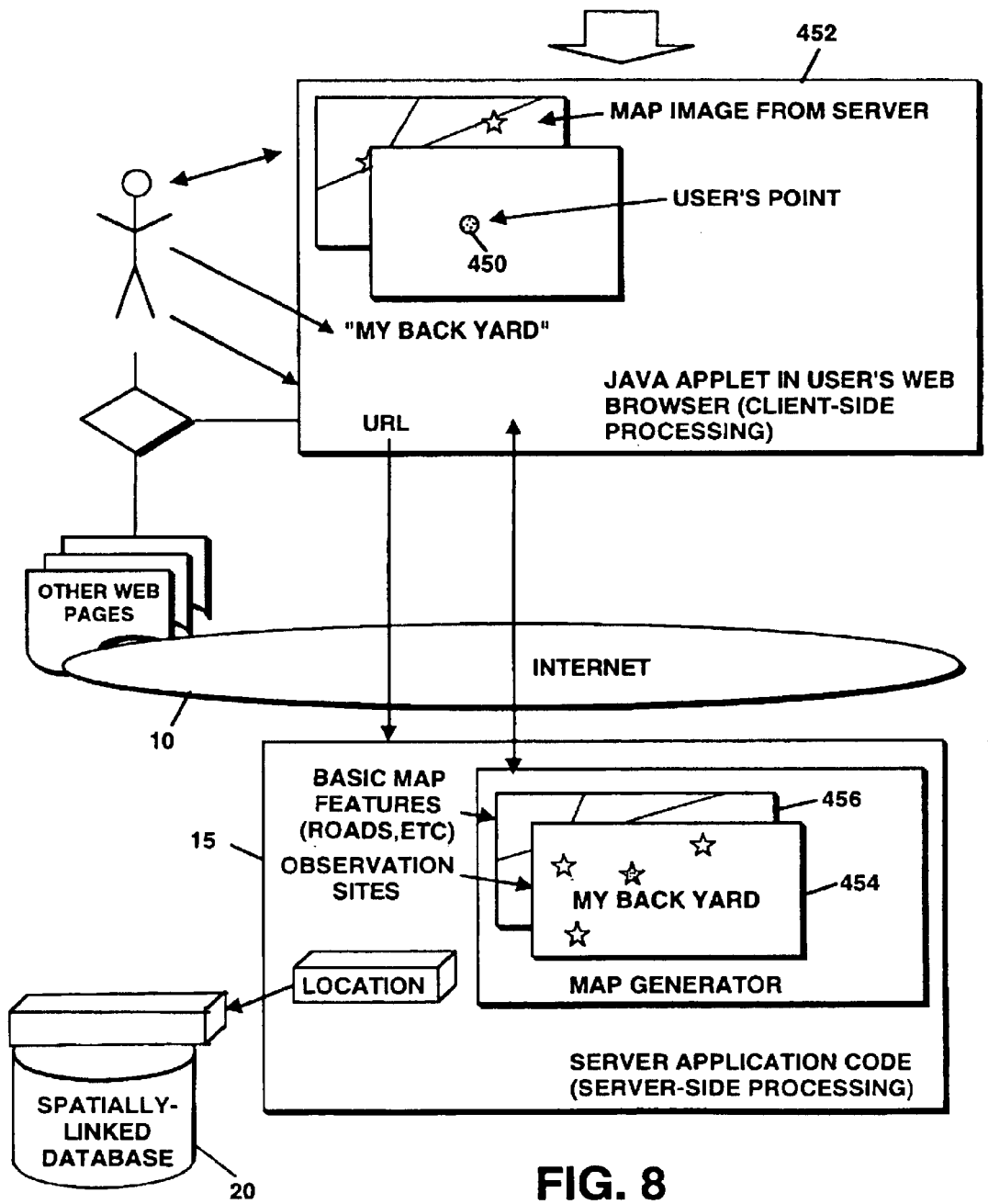
FIG. 8 is a part block diagram, part flow chart of the creation of an observation point according to the present invention.

FIG. 8 is a part block diagram, part flow chart of the creation of an observation point, or location. The user specifies a point 450 in the interactive map at the client 452. The client provides the data over the Internet 10 to the server 15 which stores the point in the spatially-linked database 20. The point can be seen as part of a map layer 454, overlaid on a map 456 of the geographic features of the area.

Figure 9:
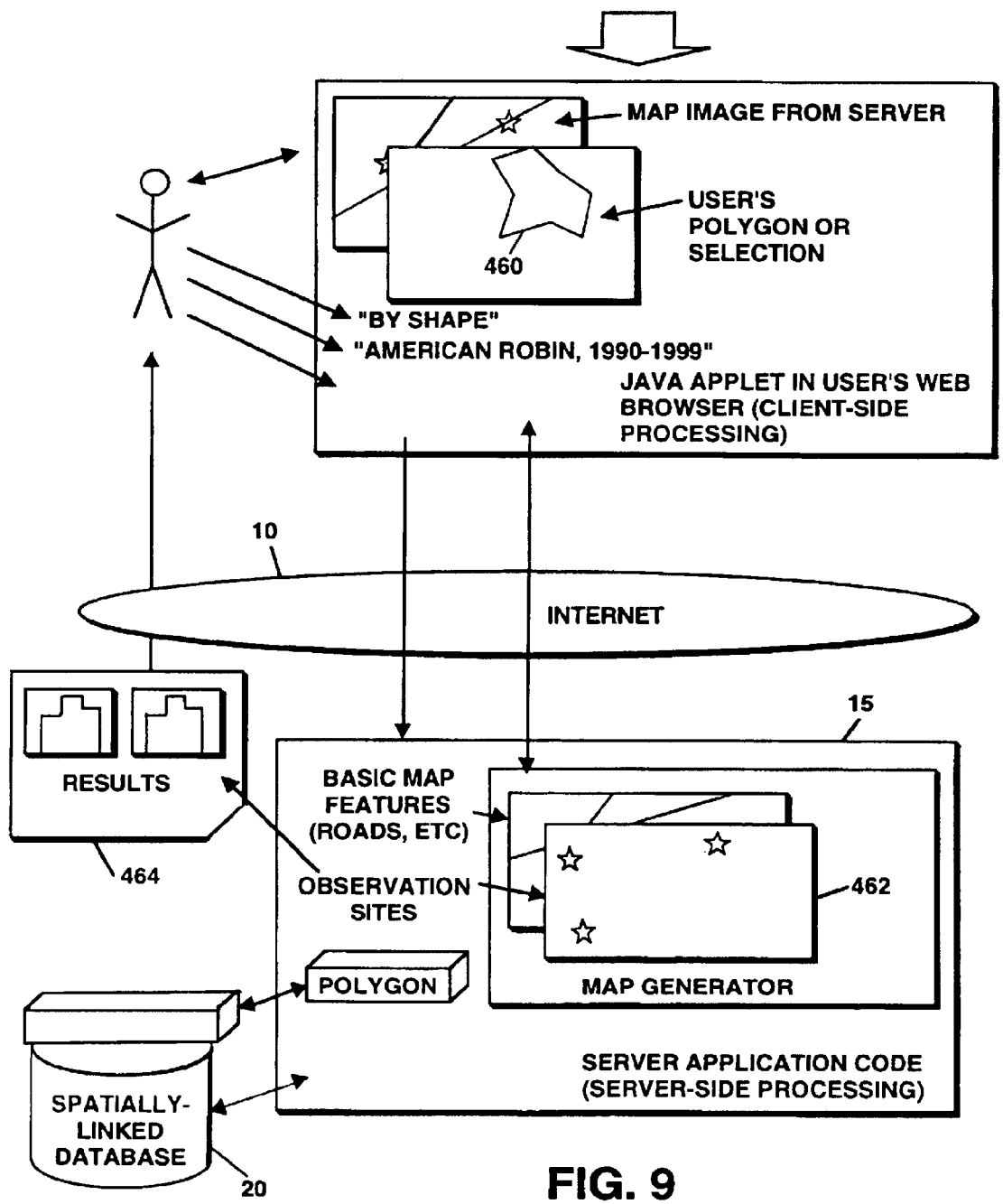
FIG. 9 is a part block diagram, part flow chart of a query according to the present invention.

FIG. 9 is a part block diagram, part flow chart of the query process. The user, at the client level 452, provides a polygon 460 or some other selection of points to be included in the query. The user can provide additional information in the query such as, type of bird and time period during which observations were taken. The client program sends the data over the Internet 10 to the server 15 which generates a map layer 462 to return to the user as well as query results in other visual formats such as a histogram 464.

The implementation described herein was applied to ornithology, however other applications, as would be contemplated by one skilled in the art, are within the scope of this invention. It may be applied to any wildlife for reporting and inventory purposes, or for reporting specific problems, e.g. disease, symptoms, or danger to humans. Wildlife includes mammals, aquatic life, amphibians, reptiles, and butterflies, etc. Wildlife can also include plant life, e.g., taking inventory on a tree species, or an offshore algal bloom. The present invention may also be used for disease tracking in humans or studying commercial product use. The present invention may also be used to study weather conditions, illegal dump sites, crime or suspicious activity. The present invention may also be used to study electromagnetic fields, e.g., users reporting on signal strength of their cell phones in different locations to a company. The present invention may also be used for amateur archeology, for example, for reporting where fossils or artifacts are found. Other applications within the spirit of this invention include without limitation environment impact studies, e.g., the construction industry; any monitoring project requiring localized information analyzed towards regional applications; self reported household usage of products and service by geographic area; auditing the performance of transportation systems, e.g., a transportation system; analysis of energy usage geographically; marketing information analysis, e.g., distributed mapping of marketing "hits"; commercial application of existing data as an indicator of changes in environmental systems; data gathering for a particular industry and providing analysis for that industry; track the spread of a disease; monitor the growth or condition of plants in a geographic area; monitor the location of vehicles, e.g., vans, taxes, service vehicles etc.; the use by consumers of pesticides and fertilizers; the geographic incidence of traffic and other accidents; and other events/applications as would be appreciated by one skilled in the art.

Additional implementations of the invention include the entry of data into computers that are off-line for later uploading to the map server over the web.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A computer-implemented method for aggregating and expressing geographically-linked data provided by a plurality of observers, comprising the steps of:

a) providing an interactive map capable of receiving geographical location and associated data over the Internet from a plurality of observers;

b) receiving a first geographical location and first associated data from a first observer;

c) storing said geographical location and said first associated data received from said first observer in a database as data records according to said geographical location;

d) receiving a second location and second associated data from a second observer;

e) repeating steps c) and d) with said second location and second associated data;

f) receiving a spatial query from a user specifying at least one location on said interactive map; and g) providing from the database the data records associated with the user-specified at least one location, the data records provided being from among the data records received from the plurality of observers and stored in the database.

2. The method of claim 1 further comprising the step of translating said first location to one or more map coordinate points; and wherein said step of storing said first location further comprises storing said map coordinate points in said database.

3. The method of claim 1 further comprising the step of translating said first location to a line; and wherein said step of storing said first location lher comprises storing said line in said database.

4. The method of claim 1 further comprising the step of translating said first location to a polygon; and wherein said step of storing said first location further comprises storing said polygon in said database.

5. The method of claim 1 wherein said second location overlaps said first location.

6. The method of claim 1 further comprising the steps of:
i) receiving a user-specified link factor;
j) selecting data records from said database using said first link factor;
k) creating a map overlay by linking said selected records; and
l) overlaying said map overlay on said interactive map.

7. The method of claim 1 further comprising the steps of providing a plurality of references to each of said locations in said interactive map, any one of said plurality of references to be used as a location point specifier.

8. The method of claim 7 wherein the step of providing a plurality of references further comprises displaying a list of available references for a user-specified location on the interactive map.

9. The method of claim 1 wherein said interactive map has a plurality of layers and said at least one location is specified according to layer.

10. The method of claim 7 wherein said plurality of references includes longitude and latitude.

11. The method of claim 7 wherein said plurality of references includes a place name.

12. The method of claim 7 wherein said plurality of references includes an observer-specified name.

13. The method of claim 7 wherein said plurality of references includes geographical association reference.

14. The method of claim 6 wherein said link factor is a selected entry type in said data records.

15. The method of claim 6 wherein said link factor is a project name included m said data records.

16. The method of claim 6 further composing the steps of:
m) receiving at least one additional user-specified link factor;
n) selecting additional data records from said database using said at least one additional link factor;
o) creating a second map overlay by linking said additional data records; and
p) overlaying said second map overlay on said interactive map.

17. A computer-implemented method for accumulating geographically-linked data in order to respond to geographically based queries, comprising the steps of:
a) providing an interactive map capable of receiving geographical location and associated data over the Internet from a plurality of observers)
b) receiving a plurality of geographical locations and a plurality of associated data from an observer;
c) translating said plurality of locations to one or more map coordinate points;
d) storing said one or more map coordinate points and said plurality of associated data in a spatially-linked database as data records;
e) receiving at least one geographical based query from at least one user, said at least one user specifying at least one location point on said interactive map; and
f) providing from the database the data records associated with the user-specified at least one location, the data records provided being from among the data records received from the plurality of observers and stored in the database.

18. A computer-implemented method for conducting ornithology studies, comprising the steps of:
a) providing a web-based interactive map capable of receiving as input locations and associated data from a plurality of observers;
b) creating a plurality of bird observation sites in a spatially-linked database in response to input from said plurality of observers;
c) receiving input locations and associated data from said plurality of observers;
d) translating said received input locations to map coordinate points;
e) relating the received associated data to bird observation sites among the created bird observation sites using said map coordinate points; and
f) populating the spatially-linked database with the associated data received from the plurality of observes at respective related bird observation sites.

19. The method of claim 18 further comprising the steps of:
g) accepting a spatial query from a user, said spatial query including at least one bird observation site;
h) accessing said database for data records associated with said at least one bird observation site; and
i) creating a report from data records found in step h).

20. The method of claim 19 wherein said spatial query further comprises a bird species.

21. A computer-implemented method for collecting data associated with a point of interest, the location of the point of interest being initially undetermined, the collected data being indicative of an event occurring at the point of interest, said method comprising the steps of:
a) providing at least one interactive geographically referenced map for receiving a mark indicative of the relative position of a point of interest, the at least one map including at least one reference point whose geographic coordinates are known;
b) receiving the mark indicative of the relative position of the point of interest;
c) processing the relative position of the point of interest with respect to the at least one reference point to determine geographic coordinates of the point of interest; and
d) associating the geographic coordinates of the point of interest with data in a geographically-linked database related to the one point of interest, the associated data having previously been received from at least one observer and stored in the database.

22. A computer-implemented method for facilitating the collection and inputting of data to a centrally disposed database by a plurality of data gatherers by use of a network which is accessible from points within a geographic area, the data being indicative of an event occurring at one of a plurality of points of interest within the geographic area, the location of the plurality of points of interest being initially undermined, said method comprising the steps of:
a) downloading over the network upon request of at least one of the plurality of data gatherers at least one geographically referenced map to the at least one data gatherer, the at least one geographically referenced map including at least one reference point whose geographic coordinates are known and being adapted to receive a mark inputted by the at least one data gatherer and indicative of the relative position of the one point of interest;
b) receiving over the network form the at least one data gatherer at the centrally disposed database the mark and the data related to the mark;
c) processing the relative position of the one point of interest with respect to the one reference point to determine the geographic coordinates of the one point of interests; and d) storing the received data related to the point of interest and The geographic coordinates associated with the point of interest in the centrally disposed database.

23. The computer-implemented method of claim 22, wherein the database includes a plurality of storage locations that are respectively addressable by the coordinates of corresponding points of interest, and there is a further included the step of inputting the data related to the one point of interest to the storage location addressed by the coordinates of the data related to the corresponding point of interest.

24. The method of constructing and inputting data into a database, which is connected to a network and is accessible from a plurality of points of interest within a geographic area, the location of the plurality of points of interest being initially undetermined, the data being indicative of an event occurring at one of a plurality of points of interest within the geographic area, said method comprising the steps of:

a) constructing a database to have a plurality of storage locations, each of said storage locations being dedicated to receive data over the network relative to a corresponding point of interest and addressable in accordance with the geographic coordinates of the corresponding point of interest;

b) providing at least one interactive geographically referenced map to a data gatherer for receiving from the data gatherer a mark indicative of The relative position of the point of interest, the at least one map including at least one reference point whose geographic coordinates are known;

c) processing the relative position of the point of interest with respect to the at least one reference point to determine geographic coordinates of the point of interest;

d) addressing one of the storage locations according to the geographic coordinates of the point of interest; and e) inputting data received from the data gatherer relative to the point of interest into the addressed storage location.

* * * * *

UNITED STATES PATENT AND TRADEMARK OFFICE
CERTIFICATE OF CORRECTION

PATENT NO.   : 6,772,142 B1
DATED        : August 3, 2004
INVENTOR(S)  : Steven T. Kelling et al.

It is certified that error appears in the above-identified patent and that said Letters Patent is hereby corrected as shown below:

Column 9,
Line 46, "plurality of observers)" should read -- plurality of observers; --

Signed and Sealed this

Twenty-eighth Day of September, 2004

JON W. DUDAS
*Director of the United States Patent and Trademark Office*

INTER PARTES REEXAMINATION CERTIFICATE (0363rd)

United States Patent
Kelling et al.

(10) Number: US 6,772,142 C1
(45) Certificate Issued: Apr. 3, 2012

(54) METHOD AND APPARATUS FOR COLLECTING AND EXPRESSING GEOGRAPHICALLY-REFERENCED DATA

(75) Inventors: Steven T. Kelling, Berkshire, NY (US);
Ronald M. Beloin, Ithaca, NY (US);
John W. Fitzpatrick, Ithaca, NY (US);
Frank B. Gill, Rushland, PA (US);
Roger L. Slothower, Ithaca, NY (US);
Thomas A. Fredericks, Van Etten, NY (US)

(73) Assignee: Cornell Research Foundation, Inc., Ithaca, NY (US)

Reexamination Request:
No. 95/000,554, Jun. 23, 2010

Reexamination Certificate for:
Patent No.: 6,772,142
Issued: Aug. 3, 2004
Appl. No.: 09/702,407
Filed: Oct. 31, 2000

Certificate of Correction issued Sep. 28, 2004.

(51) Int. Cl.
*G06F 17/30* (2006.01)

(52) U.S. Cl. ............................. 701/454; 707/999.003; 707/999.001; 707/E17.018; 709/217

(58) Field of Classification Search ....................... 707/3
See application file for complete search history.

(56) References Cited

To view the complete listing of prior art documents cited during the proceeding for Reexamination Control Number 95/000,554, please refer to the USPTO's public Patent Application Information Retrieval (PAIR) system under the Display References tab.

*Primary Examiner* — Mark Sager

(57) ABSTRACT

A web-based implemented system in which observers may pinpoint locations on a scalable map in order to fix data by latitude and longitude and to collect data describing that location. Also permitted within the system is the selection of non-contiguous groups of geographic data points for analysis. Although not limited thereto, the system may be used to track bird sightings and migration patterns as well as other bird related information and data. The mapping is scalable and can be integrated with a Geographic Information System (GIS), e.g. elevation, vegetation or city maps. Variations over time can be analyzed for a specific point, and pattern movements across points can be tracked.

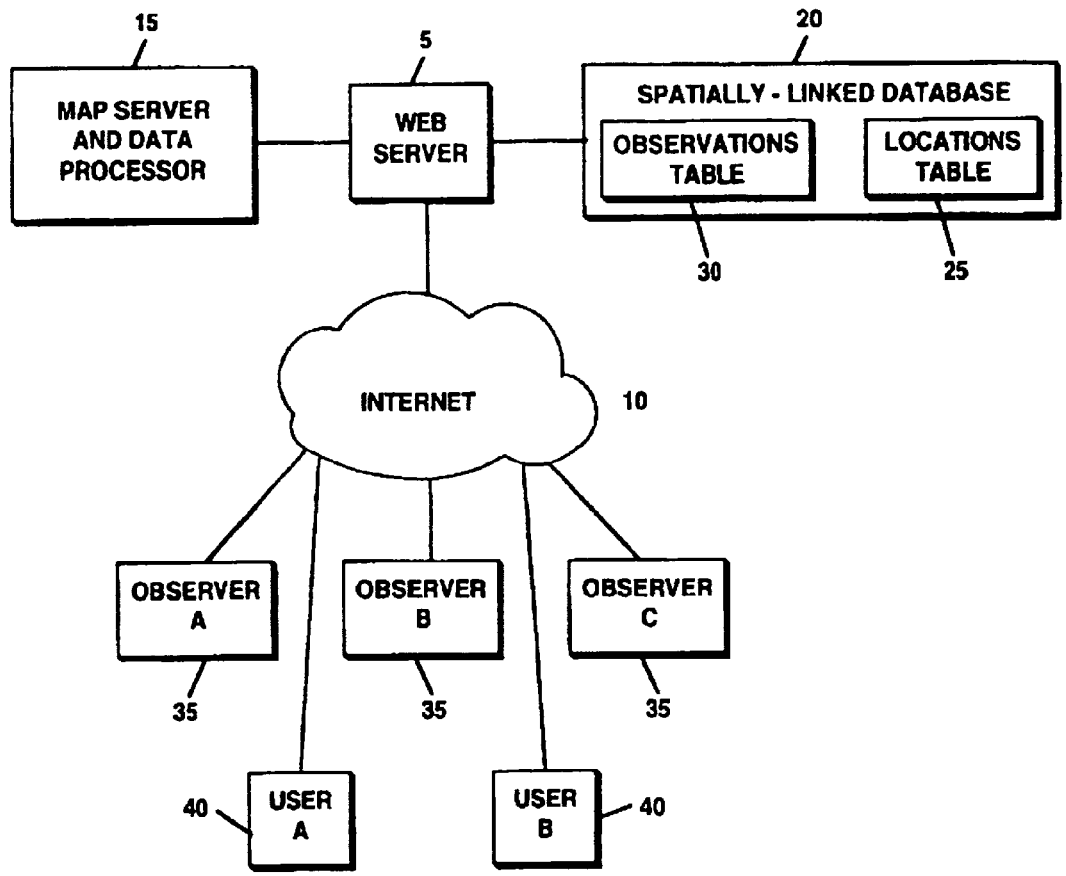

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-24 are cancelled.

\* \* \* \* \*